United States Patent
Manabe et al.

(10) Patent No.: US 8,437,520 B2
(45) Date of Patent: May 7, 2013

(54) MEDICAL IMAGE PROCESSOR AND MEDICAL IMAGE PROCESSING METHOD

(75) Inventors: Takahiro Manabe, Yokohama (JP); Yasuko Fujisawa, Otawara (JP)

(73) Assignees: Kabushiki Kaisha Toshiba, Tokyo (JP); Toshiba Medical Systems Corporation, Otawara-shi (JP)

(*) Notice: Subject to any disclaimer, the term of this patent is extended or adjusted under 35 U.S.C. 154(b) by 701 days.

(21) Appl. No.: 12/576,564

(22) Filed: Oct. 9, 2009

(65) Prior Publication Data
US 2010/0092053 A1  Apr. 15, 2010

(30) Foreign Application Priority Data
Oct. 10, 2008  (JP) .................. 2008-264206

(51) Int. Cl.
*G06K 9/00* (2006.01)
(52) U.S. Cl.
USPC ....................................... 382/128
(58) Field of Classification Search .......... 382/128, 382/132, 199
See application file for complete search history.

(56) References Cited

U.S. PATENT DOCUMENTS

| | | | | |
|---|---|---|---|---|
| 6,411,729 B1 * | 6/2002 | Grunkin | ................. | 382/132 |
| 7,133,558 B1 * | 11/2006 | Ohara et al. | ................. | 382/199 |
| 7,369,691 B2 * | 5/2008 | Kondo et al. | ................. | 382/128 |
| 7,711,163 B2 * | 5/2010 | Geiger et al. | ................. | 382/128 |
| 7,796,795 B2 * | 9/2010 | Uppaluri et al. | ................. | 382/128 |
| 2007/0230653 A1 | 10/2007 | Okamoto et al. | | |
| 2009/0268954 A1 * | 10/2009 | Niinuma et al. | ................. | 382/128 |

FOREIGN PATENT DOCUMENTS

JP  2003-79606  3/2003

* cited by examiner

*Primary Examiner* — Gerald J. O'Connor
*Assistant Examiner* — Edward Winston, III
(74) *Attorney, Agent, or Firm* — Oblon, Spivak, McClelland, Maier & Neustadt, L.L.P.

(57) ABSTRACT

A medical image processor includes: an extraction unit configured to extract a longitudinal line from three-dimensional volume data for a medical image, the longitudinal line representing how a tubular structure runs; a longitudinal cross-sectional image generator configured to generate multiple longitudinal cross-sectional images extending along the longitudinal line, the longitudinal cross-sectional images being cross-sectional images of the tubular structure; a short-axis cross-sectional image generator configured to generate multiple short-axis cross-sectional images intersecting the longitudinal line, the short-axis cross-sectional images being cross-sectional images of the tubular structure; a structure element detector configured to detect a specific structural element of the tubular structure from each of the plurality of short-axis cross-sectional images; and a correction unit configured to correct the specific structural element detected from each of the multiple short-axis cross-sectional images on a basis of the multiple longitudinal cross-sectional images.

4 Claims, 16 Drawing Sheets

HEART VOLUME DATA

FIG. 5      CUTOUT DATA (3D VOLUME)
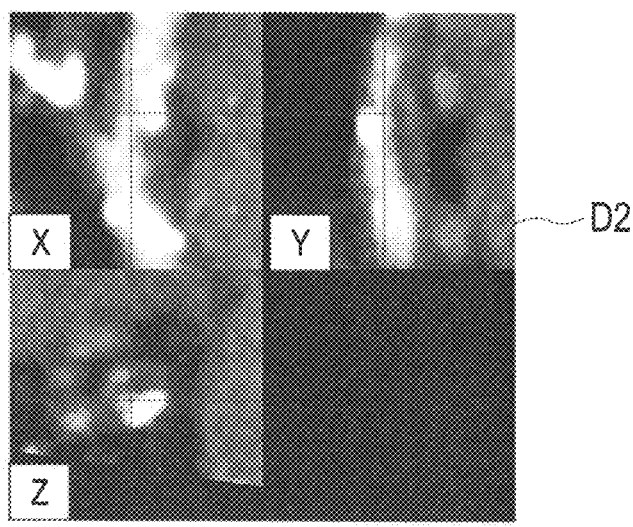
FIG. 6      HEART VOLUME DATA
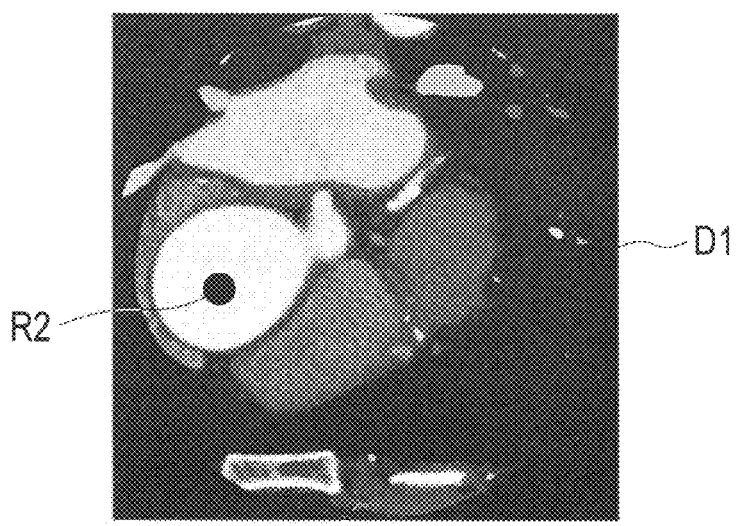

CALCIFICATION EXTRACTION RESULT

P2 AFTER CORRECTION

LUMEN EXTRACTION RESULT

EXTERNAL WALL EXTRACTION RESULT

SMOOTHED IMAGE − ORIGINAL IMAGE

PLAQUE EXTRACTION RESULT

MEDICAL IMAGE PROCESSOR AND MEDICAL IMAGE PROCESSING METHOD

CROSS REFERENCE OF THE RELATED APPLICATION

This application is based on and claims the benefit of priority from Japanese Patent Application No. 2008-264206, filed on Oct. 10, 2008; the entire contents of which are incorporated herein by reference.

BACKGROUND OF THE INVENTION

1. Field of the Invention

The present invention relates to a medical image processor for, and a medical image processing method of, processing a medical image.

2. Description of the Related Art

A medical image diagnosis system includes: a medical imaging apparatus configured to take a medical image; and a medical image processor configured to process the medical image. Examples of the medical imaging apparatus are an X-ray tomograph (an X-ray CT apparatus) and the like. This X-ray tomograph is an apparatus configured to: irradiate a subject with X-rays; detect the X-rays transmitted through the subject; and display an inside (a target body part) of the subject as a CT images.

In diagnoses of the coronary arteries using the above medical image diagnosis system, a physician manually classifies the coronary arteries into four areas: calcification, a lumen (a contrast medium), an external wall and a plaque. A clustering algorithm has been developed to perform this classification automatically (see JP-A No. 2003-79606 (KOKAI), for instance). In this conventional algorithm, two-dimensional slice angiographic images are used to automatically calculate the threshold values and thereby perform classification.

In the above-mentioned two-dimensional process, however, a classified area such as a plaque area or a calcification area suddenly appears in, or disappears from, some of a series of adjacent slice images. Accordingly, the continuity of the classified area in a slice direction (an extending direction of the blood vessel) is interrupted. In addition, overall blurring of calcification is detected as a lumen. For this reason, a false detection of a lumen due to blurring of the calcification occurs.

SUMMARY OF THE INVENTION

An object of the present invention is to provide a medical image processor and a medical image processing method which can ensure the continuity of each classification area in a slice direction, and which can accordingly prevent a false detection of a lumen.

A first aspect of an embodiment according to the present invention is a medical image processor including: an extraction unit configured to extract a longitudinal line from three-dimensional volume data for a medical image, the longitudinal line representing how a tubular structure runs; a longitudinal cross-sectional image generator configured to generate a plurality of longitudinal cross-sectional images extending along the longitudinal line, the longitudinal cross-sectional images being cross-sectional images of the tubular structure; a short-axis cross-sectional image generator configured to generate a plurality of short-axis cross-sectional images intersecting the longitudinal line, the short-axis cross-sectional images being cross-sectional images of the tubular structure; a structure element detector configured to detect a specific structural element of the tubular structure from each of the plurality of short-axis cross-sectional images; and a correction unit configured to correct the specific structural element detected from each of the plurality of short-axis cross-sectional images on a basis of the plurality of longitudinal cross-sectional images.

A second aspect of the embodiment according to the present invention is a medical image processing method including: extracting a longitudinal line from three-dimensional volume data for a medical image, the longitudinal line representing how a tubular structure runs; generating a plurality of longitudinal cross-sectional images, extending along the longitudinal line, the longitudinal cross-sectional images being cross-sectional images of the tubular structure; generating a plurality of short-axis cross-sectional images intersecting the longitudinal line, the short-axis cross-sectional images being cross-sectional images of the tubular structure; detecting specific a structural element of the tubular structure from each of the plurality of short-axis cross-sectional images; and correcting the specific structural element detected from each of the plurality of short-axis cross-sectional images on a basis of the plurality of longitudinal cross-sectional images.

BRIEF DESCRIPTION OF THE DRAWINGS

FIG. 5 is an explanatory diagram for explaining cutout data obtained in an image cutting-out processing in the image processing shown in FIG. 3.

FIG. 6 is an explanatory diagram for explaining heart volume data in a calcification extracting processing in the image processing shown in FIG. 3.

DESCRIPTION OF THE PREFERRED EMBODIMENTS

Figure 1:
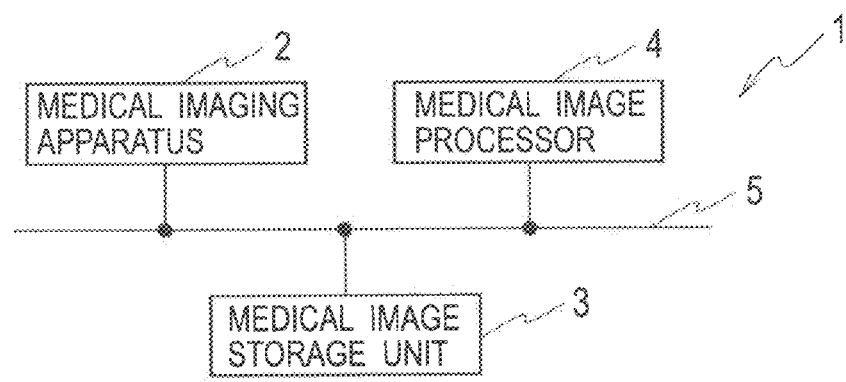
FIG. 1 is a block diagram showing a schematic configuration of a medical image diagnosis system according to an embodiment of the present invention.

Referring to the drawings, descriptions will be provided for an embodiment of the present invention.

As shown in FIG. 1, a medical image diagnosis system 1 according to the embodiment of the present invention includes: a medical imaging apparatus 2 configured to take a medical image of a target body part (for instance, the heart) of a subject; a medical image storage unit 3 configured to store the thus-taken medical image; and a medical image processor 4 configured to process the medical image. These components are connected together by use of a network 5 such as a LAN (Local Area Network).

The medical imaging apparatus 2 is an imaging apparatus configured to take a medical image of a target body part (a body part of interest) of a subject. For instance, an X-ray tomograph (an X-ray CT apparatus) and the like are used as this medical imaging apparatus 2. In a case where an X-ray tomograph is used, the medical image is formed as a CT image. The CT image (X-ray CT image) is acquired by: convolving with reconstruction functions X-ray projection images of a subject which are taken in multiple directions: and then applying a back projection to the results of the convolution The medical image storage unit 3 is a database in which medical images (for instance, volume data which represent CT images of each body part of the subject) acquired by the medical imaging apparatus 2 are stored. Examples of the body part of the subject are the heart, the lungs, the stomach and the like. Note that the medical images (volume data) are sent from the medical imaging apparatus 2 to the medical image storage unit 3 through the network 5.

Figure 2:
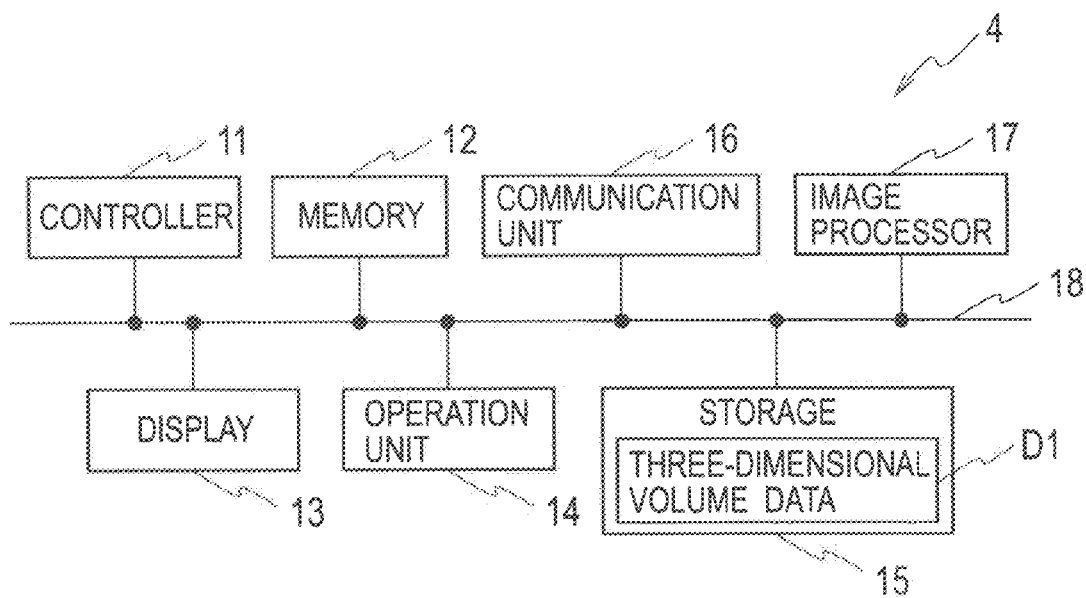
FIG. 2 is a block diagram showing a schematic configuration of a medical image processor included in the medical image diagnosis system shown in FIG. 1.

As shown in FIG. 2, the medical image processor 4 includes: a controller 11 such as a CPU (a Central Processing Unit), configured to integrally control the components in the medical image processor 4; memory 12 such as a ROM (a Read Only Memory) and a RAM (a Random Access Memory); a display 13 on which various images such as medical images are displayed; an operation unit 14 configured to receive input operations from an operator; a storage 15 in which various programs and various sets of data are stored; a communication unit 16 configured to make communications with external apparatuses; and an image processor 17 configured to process the various images such as the medical images. These components are electrically connected together by a bus line 18.

The controller 11 controls the components on the basis of the various programs and the various sets of data which are stored in the storage 15. In particular, on the basis of the various programs and the various sets of data, the controller 11 carries out: a series of data processes for performing data calculation and data process; an image process for processing medical images; and a display process for displaying the medical images.

The memory 12 is memory in which an activation program and the like executed by the controller 11 are stored, and is also memory which functions as work areas for the controller 11. Note that the activation program is read and executed by the controller 11 when the medical image processor 4 is activated.

The display 13 is a display unit on which various images such as two-dimensional images and three-dimensional images in color are displayed. For instance, a liquid crystal display, a Cathode Ray Tube (CRT) display and the like are used as this display 13.

The operation unit 14 is an input unit through which the operator carries out input operations. The operation unit 14 receives various input operations such as starting an image display, switching images from one to another, and changing setups. For instance, input devices such as a mouse and a keyboard are used as this operation unit 14.

The storage 15 is a storage unit in which various programs and various sets of data are stored. Particularly, the storage 15 is a storage unit in which three-dimensional volume data D1 on each body part are stored, the three-dimensional volume data D1 sent from the medical image storage unit 3 through the network 5 for image processing. For instance, a magnetic disc unit, a semiconductor disc unit (flash memory) and the like are used as this storage 15.

The communication unit 16 is a unit configured to make communications with external apparatuses through the network 5 such as the LAN and the Internet. A LAN card, a modem and the like are used as this communication unit 16. Examples of the external apparatuses are the medical imaging apparatus 2, the medical image storage unit 3 and the like.

The image processor 17 is a unit configured to perform an image processing on the three-dimensional volume data D1. For instance, this image processor 17 performs the clustering of the coronary artery on heart volume data as the three-dimensional volume data D1. Specifically, the image processor 17 automatically classifies the coronary artery in four areas: calcification, a lumen (a contrast medium), an external wall and a plaque. Note that the image processor 17 is configured of either or both of software and hardware (circuits). This image processor 17 functions as an extractor, a longitudinal cross-sectional image generator, a short-axis cross-sectional image generator, a structure detector and a corrector.

Next, descriptions will be provided for an image processing (medical image processing method) performed by the image processor 17. Here, described is a case where: a target body part is the heart; and as the three-dimensional volume data D1, the heart volume data is stored in the storage 15. Note that various sets of data used for the processing are stored in the storage 15 temporarily or for a long period depending on the necessity.

Figure 3:
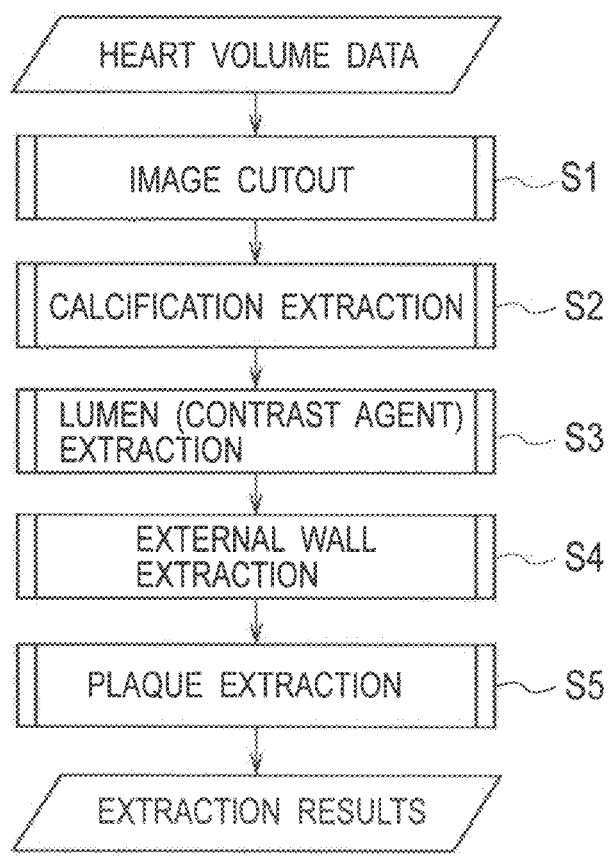
FIG. 3 is a flowchart showing a flow of an image processing performed by the medical image processor shown in FIG. 2.

As shown in FIG. 3, the image processor 17 performs an image cutting-out processing (step S1), a calcification extracting processing (step S2), a lumen (contrast medium) extracting processing (step S3), an external wall extracting processing (step S4) and a plaque extracting processing (step S5), as basic processes, on the heart volume data. Thus, the image processor 17 acquires extraction results.

During this processing, multiple longitudinal cross-sectional images and multiple short-axis cross-sectional images of a tubular structure (for instance, a blood vessel) are generated. The longitudinal cross-sectional images are cross-sectional images of the blood vessel, which are imaged along a center line (core line) as a longitudinal line representing how the blood vessel runs. The short-axis cross-sectional images are cross-sectional images of the blood vessel, which are imaged along the respective lines intersecting the center line (core line). For instance, multiple longitudinal cross-sectional images radially intersecting one another on a line in parallel with the longitudinal line are generated. On the basis of these longitudinal cross-sectional images and short-axis cross-sectional images, specific structural elements are detected. Examples of the specific structural elements are a lumen, an external wall, a calcification area, and a plaque area of the blood vessel. Such longitudinal cross-sectional images and short-axis cross-sectional images are used depending on the necessity.

Figure 4:
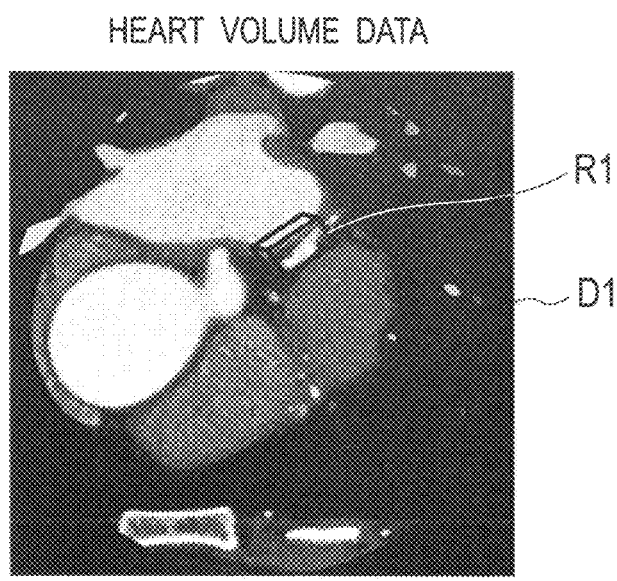
FIG. 4 is an explanatory diagram for explaining heart volume data in an image cutting-out processing in the image processing shown in FIG. 3.

In step S1 of FIG. 3, as shown in FIG. 4, a processing region R1 being a target region is cut out from the heart volume data D1. A three-dimensional processing is applied to the cut-out processing region R1. Thereby, as shown in FIG. 5, cut-out volume data (3D volume data) D2 is acquired. Note that a portion of the coronary artery being the blood vessel is cut out as the processing region R1. The blood vessel is an example of the tubular structure.

Figure 7:
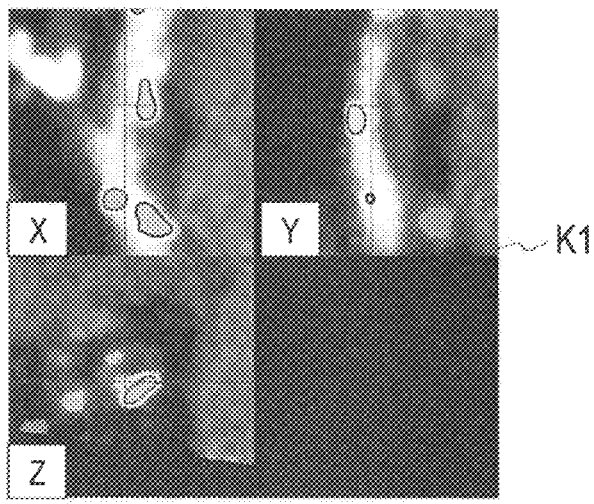
FIG. 7 is an explanatory diagram for explaining a calcification extraction result obtained in the calcification extracting processing in the image processing shown in FIG. 3.

In step S2 of FIG. 3, as shown in FIG. 6, a CT value of the aortic root R2 is acquired from the heart volume data D1. A region having a CT value more than 1.2 times as large as the CT value of the aortic root R2 is extracted as the calcification (calcified plaque). Thus, as shown in FIG. 7, a calcification extraction result K1 is obtained. It should be noted that: the fact that the CT value of the calcification is higher than the CT value of the contrast medium is used; and particularly the CT value of the aortic root R2 whose partial volume effect is smaller is used.

Figure 8:
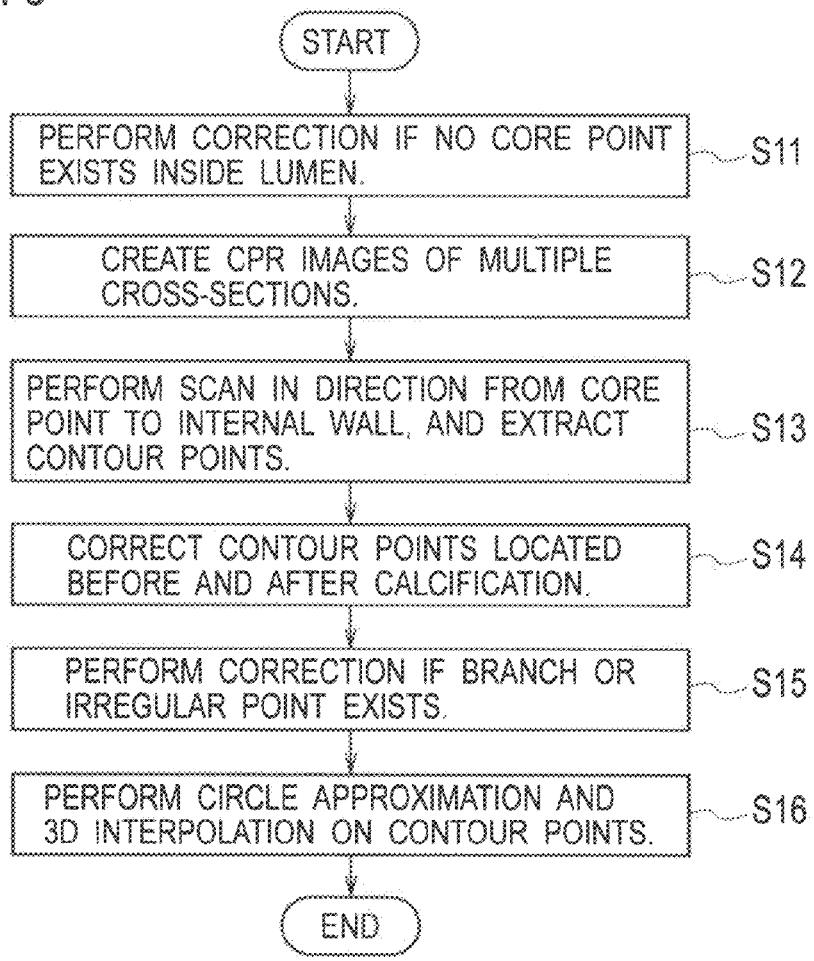
FIG. 8 is a flowchart showing a flow of a lumen extracting processing in the image processing shown in FIG. 3.

In step S3 of FIG. 3, as shown in FIG. 8, firstly, the correction is performed if a core point P1 does not exist in the lumen (step S11). Subsequently, Curved Planer Reconstruction (CPR) images of multiple cross-sections of the coronary artery are created from the cut-out volume data D2 (step S12). Scan in a direction from the core point P1 to the internal wall is performed, and contour points P2 of the internal wall are extracted (step S13). Afterward, a correction is applied to contour points P2 located before and after a calcification (step S14). If a branch or an irregular point is found, a further correction is made (step S15). Thereafter, the circular approximation and the three-dimensional interpolation (3D interpolation) are applied to the contour points P2 of the lumen (step S16). Note that each CPR image is a curved multi planer reconstruction image including multiple slice images. Examples of the slice images are longitudinal cross-sectional images and short-axis cross-sectional images. These slice images are used depending on the necessity.

Figure 9:
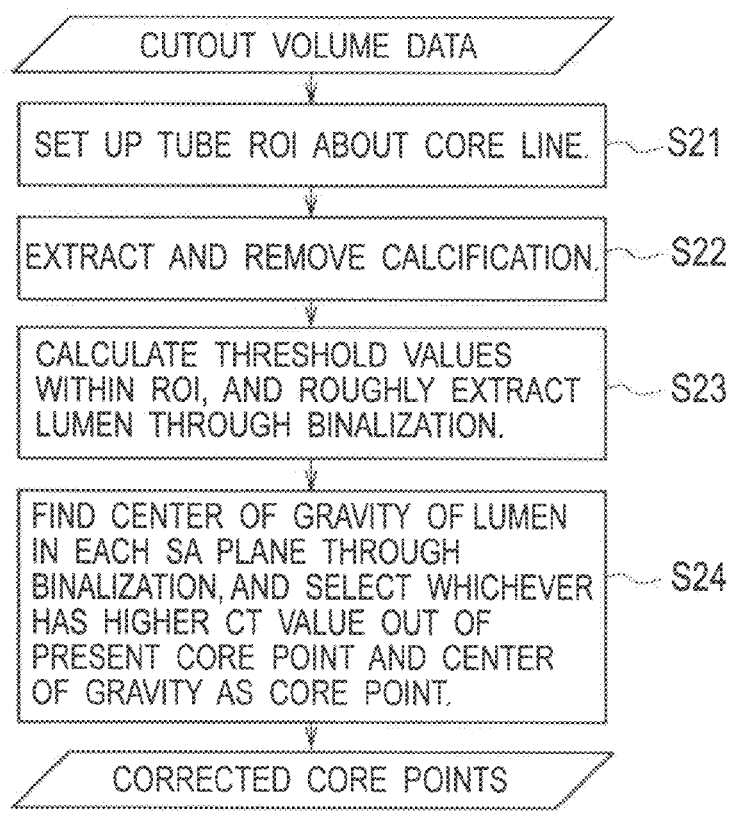
FIG. 9 is a flowchart showing a flow of a core point correcting processing in the lumen extracting processing shown in FIG. 8.

In step S11 of FIG. 8, as shown in FIG. 9, firstly, a ROI (Region Of Interest which is three-dimensional) is set up about the core line from the cutout volume data D2 (step S21). Subsequently, calcification is extracted and thus removed from the ROI (step S22). Thereafter, on the basis of a histogram within the ROI from which the calcification area has been removed, threshold values are calculated, and the lumen is roughly extracted through binarization (step S23). Afterward, in each SA plane (slice plane), the center of gravity of the lumen is found through binarization, and whichever has a higher CT value out of the found center of gravity or the core point is selected as a core point P1 (step S24). In this manner, each core point P1 is corrected.

Figure 10:
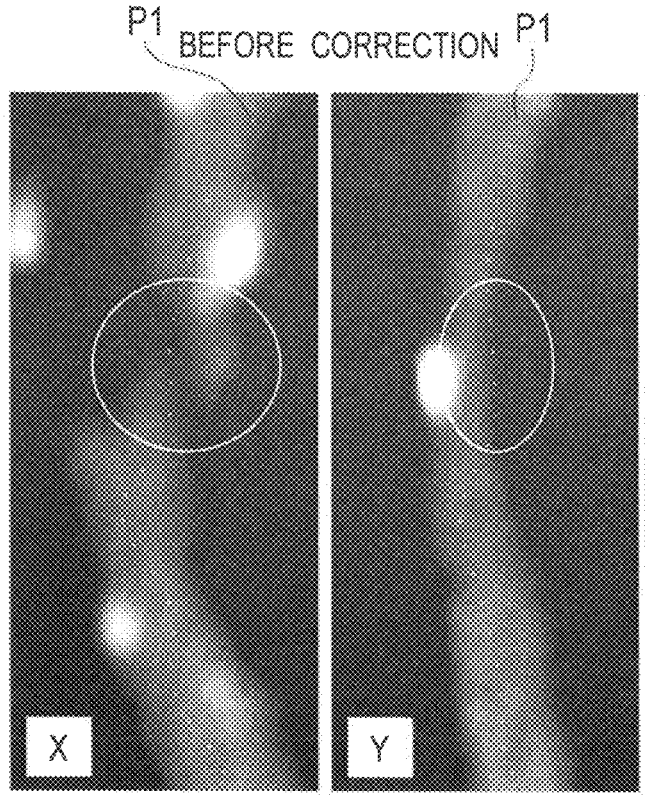
FIG. 10 is an explanatory diagram for explaining how core points are corrected in the core point correcting processing shown in FIG. 9.
Figure 11:
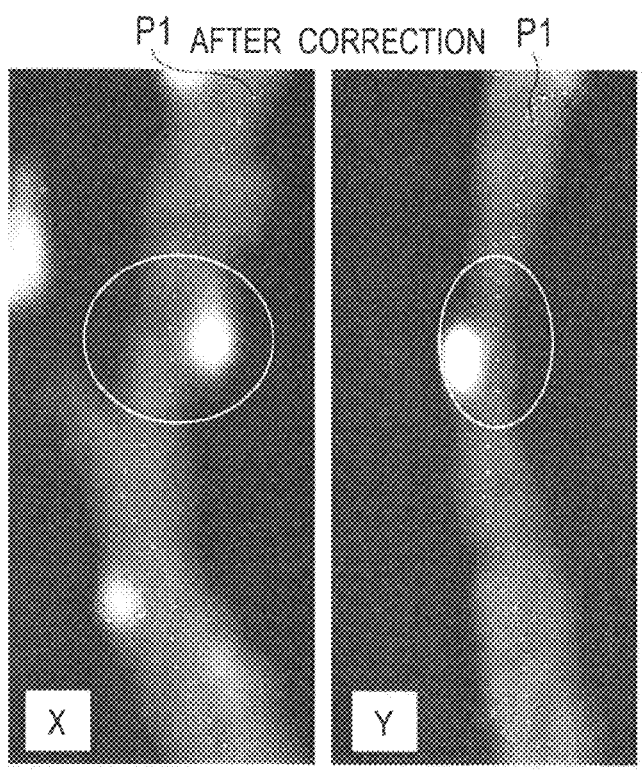
FIG. 11 is another explanatory diagram for explaining how the core points are corrected in the core point correcting processing shown in FIG. 9.

If some core points P1 are off a region corresponding to the lumen as shown in FIG. 10 (see regions located inside the respective white circles in FIG. 10), the core points P1 are corrected through the above-described processing in order that all the core points P1 should be in the region corresponding to the lumen. Thereby, as shown in FIG. 11, all the core points P1 exist in the region corresponding to the lumen (see regions located inside the respective white circles in FIG. 11). Note that the core line is a line passing through these core points P1.

Figure 12:
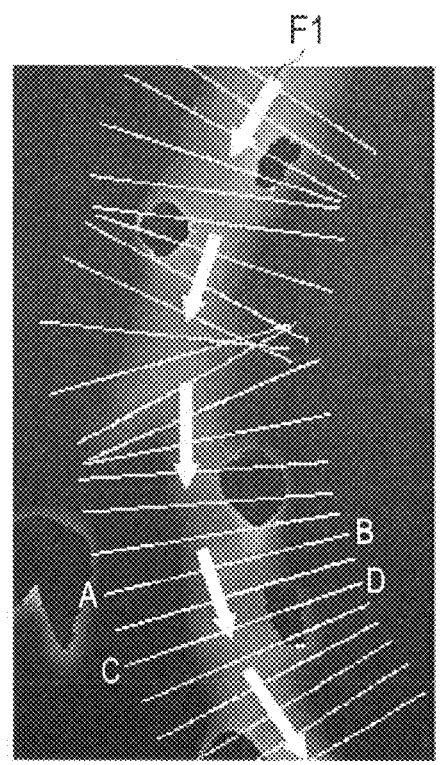
FIG. 12 is an explanatory diagram for explaining how contour points are extracted in the lumen extracting processing shown in FIG. 8.
Figure 13:
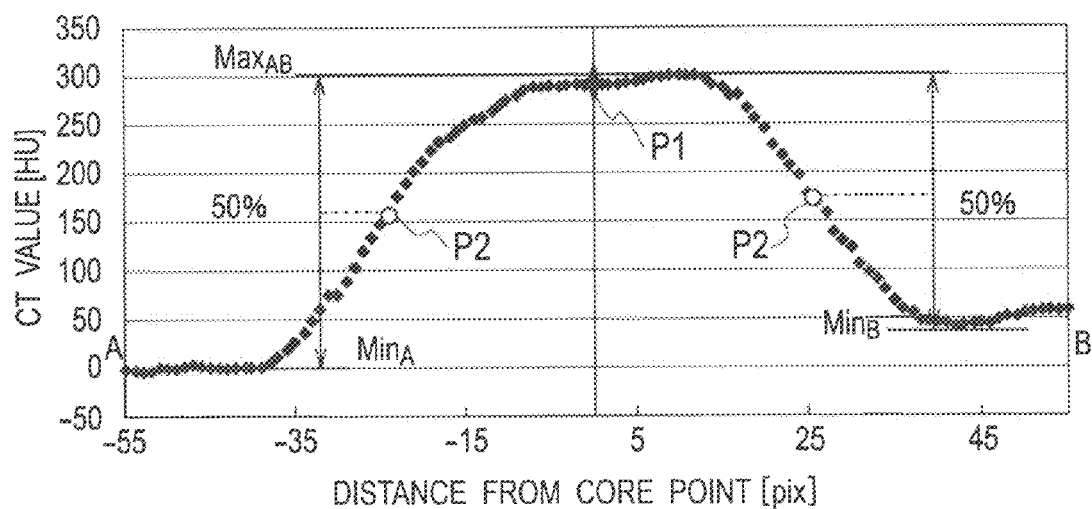
FIG. 13 is an explanatory diagram for explaining a first profile obtained from a first profile cross-section shown in FIG. 12.
Figure 14:
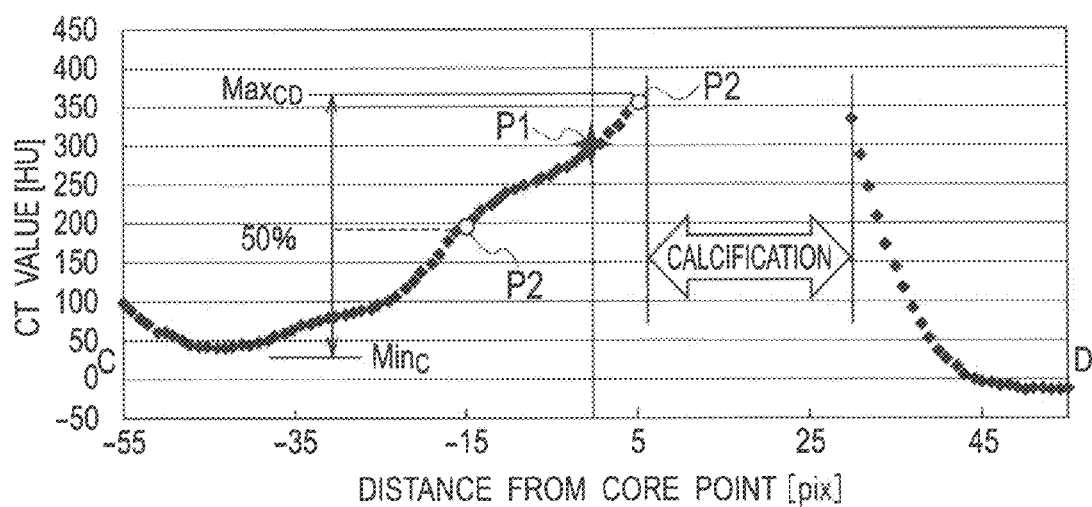
FIG. 14 is an explanatory diagram for explaining a second profile obtained from a second profile cross-section shown in FIG. 12.
Figure 15:
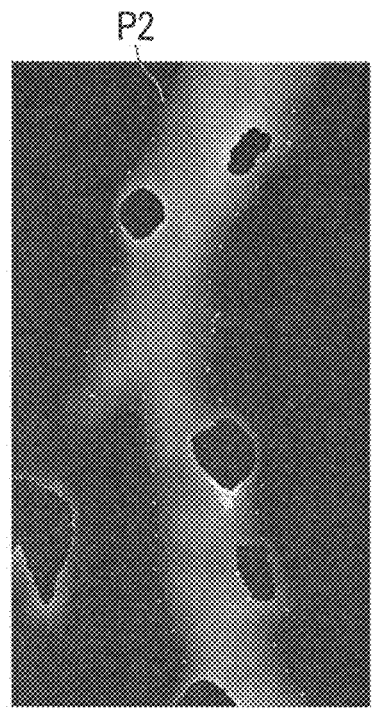
FIG. 15 is another explanatory diagram for explaining how contour points are extracted in the lumen extracting processing shown in FIG. 8.

In steps S12 and S13 of FIG. 8, as shown in FIG. 12, profile cross-sections perpendicular to the direction of the core line (the direction of the vessel, see arrows shown in FIG. 12) are sequentially formed, for instance. In each profile cross-section, a scan is made in a direction toward the internal wall. Thereby, profiles respectively shown in FIGS. 13 and 14 are obtained about the core line P1, for instance. Note that: the profile shown in FIG. 13 is obtained from a profile cross-section AB shown in FIG. 12; and the profile shown in FIG. 14 is obtained from a profile cross-section CD shown in FIG. 12. From each of the thus-obtained profiles, as shown in FIG. 15, multiple contour points P2 indicating the lumen are extracted.

In each profile, threshold values for extracting a contour point P2 in a positive direction and that in a negative direction of the profile are set up independently of each other. In the profile shown in FIG. 13, a position corresponding to 50% of the sum of the largest CT value and the smallest CT value is extracted as the contour point P2 of the lumen in each of the positive and negative directions of the profile. In the profile shown in FIG. 14, a position corresponding to 50% of the sum of the largest CT value and the smallest CT value is extracted as a contour point P2 of the lumen in the negative direction of the profile, whereas a position of a calcification is extracted as a contour point P2 of the lumen in the positive direction of the profile because the scan is interrupted by the calcification.

Figure 16:
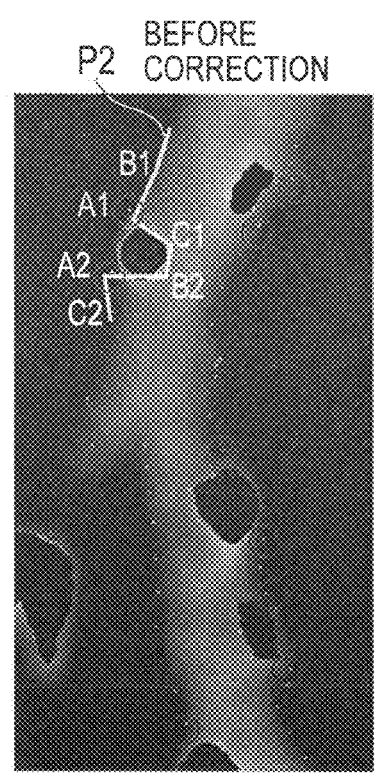
FIG. 16 is an explanatory diagram for explaining how contour points located before and after calcification are corrected in the lumen extracting processing shown in FIG. 8.
Figure 17:
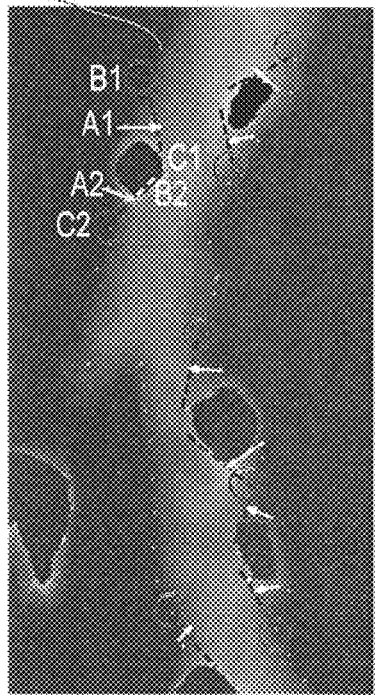
FIG. 17 is another explanatory diagram for explaining how the contour points located before and after the calcification are corrected in the lumen extracting processing shown in FIG. 8.
Figure 18:
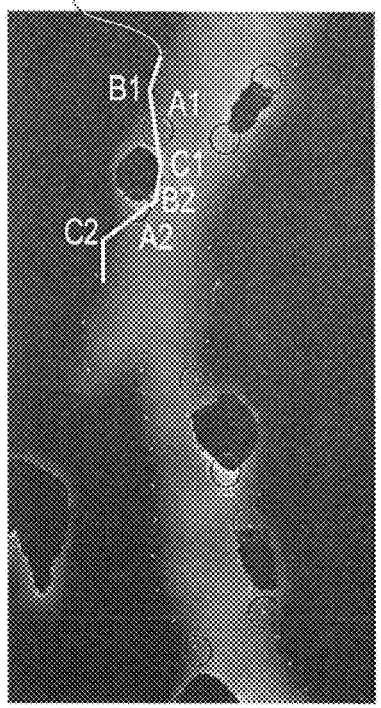
FIG. 18 is yet another explanatory diagram for explaining how the contour points located before and after the calcification are corrected in the lumen extracting processing shown in FIG. 8.

In step S14 of FIG. 8, as shown in FIG. 16, two contour points A1, A2 (contour points P2 inside the respective black circles in FIG. 16) located respectively before and after a calcification are selected, for instance. Thereafter, two contour points B1, C1 located respectively before and after the contour point A1 are selected. Similarly, two contour points B2, C2 located respectively before and after the control point A2 are selected. Subsequently, as shown in FIG. 17, an intersection at which a straight line (see a black dot line in FIG. 17) joining the contour point B1 and the contour point C1 intersects a straight line joining the contour A1 and the core point P1 (the core point in the same profile cross-section as the contour point A1) is found. Thereby, the contour point A1 is relocated to the intersection. Similarly, an intersection at which a straight line (see the other black dot line in FIG. 17) joining the contour point B2 and the contour point C2 intersects a straight line joining the contour point A2 and the core point P1 (the core point in the same profile cross-section as the contour point A2) is found. Thereby, the contour point A2 is relocated to the intersection. As shown in FIG. 18, the contour points A1, A2 located respectively before and after the calcification are corrected in this manner. Note that contour points P2 located respectively before and after any other calcification are corrected similarly.

Figure 19:
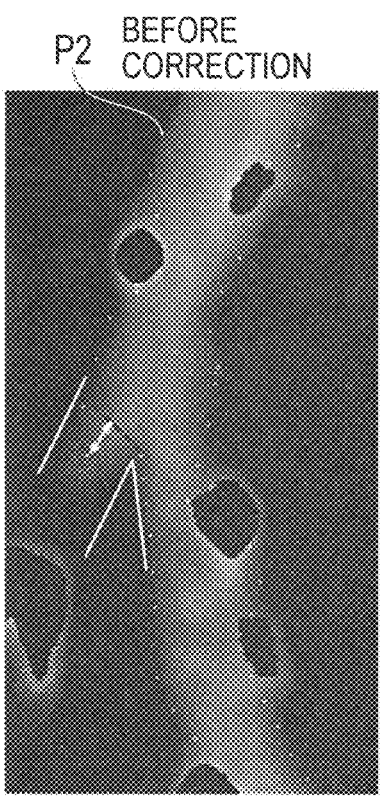
FIG. 19 is an explanatory diagram for explaining how contour points of a branch or an irregular point is corrected in the lumen extracting processing shown in FIG. 8.

In step S15 of FIG. 8, a branch judgment in the following manner. For instance, as shown in FIG. 19, a distance between a target contour point P2 (a contour point P2 inside the black circle in FIG. 19) and a straight line (see the black dot line in FIG. 19) joining two contour points P2 located respectively before and after the target contour point P2 is measured. If the distance is larger than a certain distance, the target contour point P2 is determined as a front endpoint of a branch. Similarly, the target contour point P2 located in an unusual position which causes discontinuity in the series of contour points is determined as an irregular point.

Figure 20:
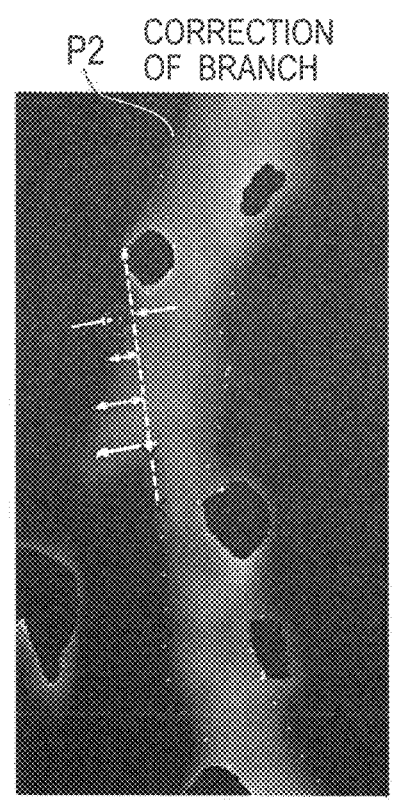
FIG. 20 is another explanatory diagram for explaining how the contour points of the branch or the irregular point is corrected in the lumen extracting processing shown in FIG. 8.
Figure 21:
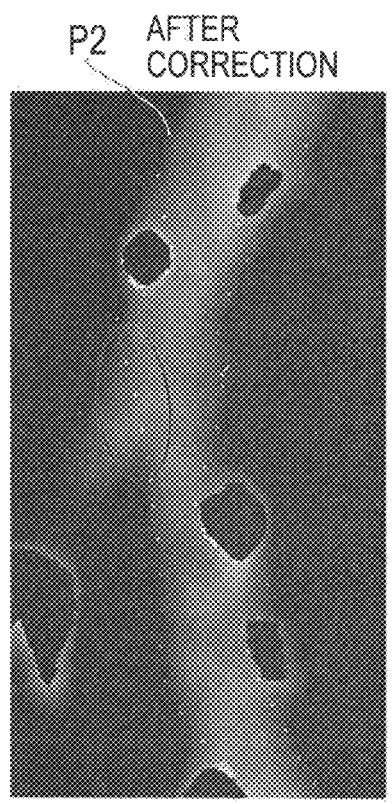
FIG. 21 is yet another explanatory diagram for explaining how the contour points of the branch or the irregular point is corrected in the lumen extracting processing shown in FIG. 8.

Furthermore, in step 15 of FIG. 8, a branch correction is performed in the following manner. For instance, as shown in FIG. 20, a contour point P2 (a contour point P2 inside the black circle in FIG. 20) located within a certain distance from a straight line (see the white dot line in FIG. 20) passing through a contour point P2 immediately next to the contour point P2 being the front endpoint of the branch (located immediately next in the direction of the vessel; see the cross in FIG. 20), and another contour point P2 being second from the contour point P2 being the front end point of the branch (located second in the direction of the vessel; see the cross in FIG. 20) is determined as the starting point of the branch. The branch is separated from the coronary artery by a straight line joining the starting point of the branch and the contour point P2 immediately next to the front end point of the branch. Thus, as shown in FIG. 21, contour points P2 outside the straight line are relocated onto the straight line (see contour points inside the black circle in FIG. 21).

Figure 22:
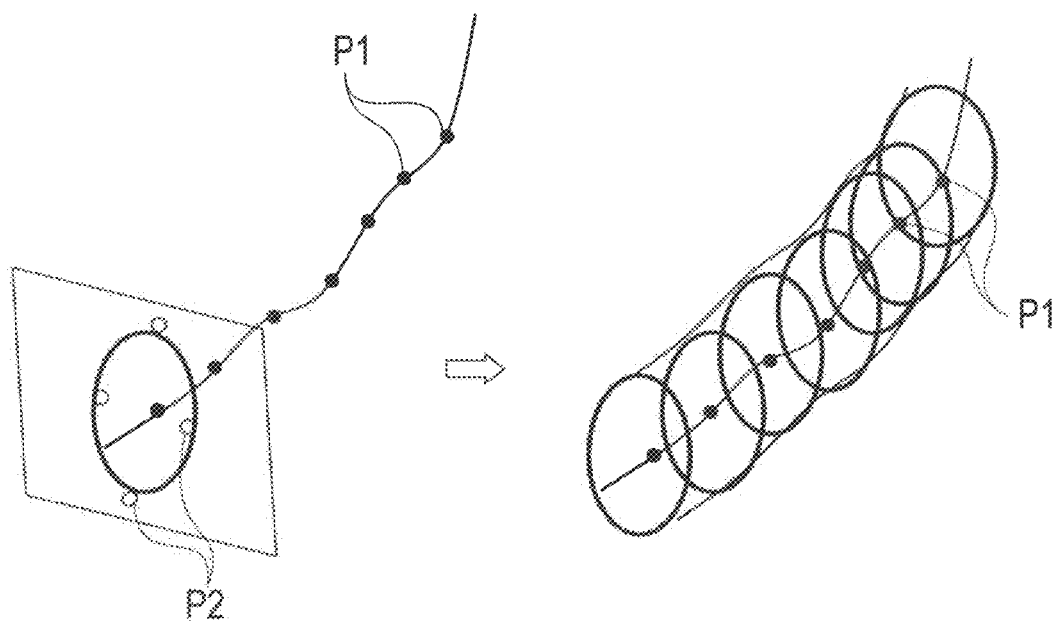
FIG. 22 is an explanatory diagram for explaining how a circle approximation and a three-dimensional interpolation are performed in the lumen extracting processing shown in FIG. 8.
Figure 23:
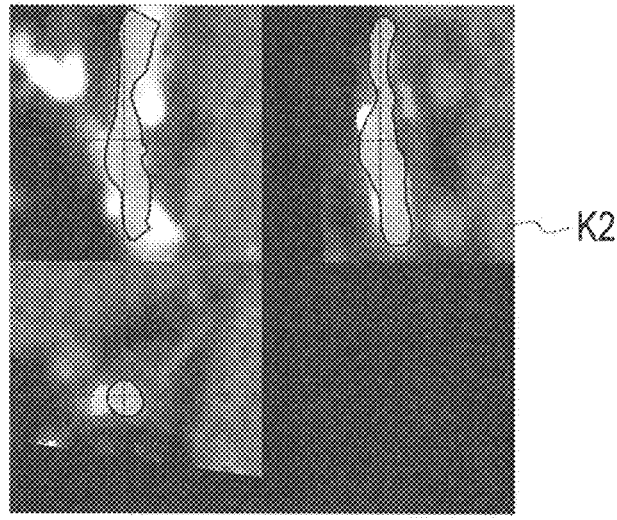
FIG. 23 is an explanatory diagram for explaining a lumen extraction result obtained through the lumen extracting process.

Finally, in step S16 of FIG. 8, for instance, as shown in FIG. 22, the contour points P2 acquired from the multiple profile cross-sections is subjected to the curve approximation such as the circle approximation for each slice plane. Furthermore, on the three-dimensional volume data D1, an interpolation is sequentially made between each two adjacent approximate circles in the slice direction. Thereby, as shown in FIG. 23, a lumen extraction result K2 is obtained.

Figure 24:
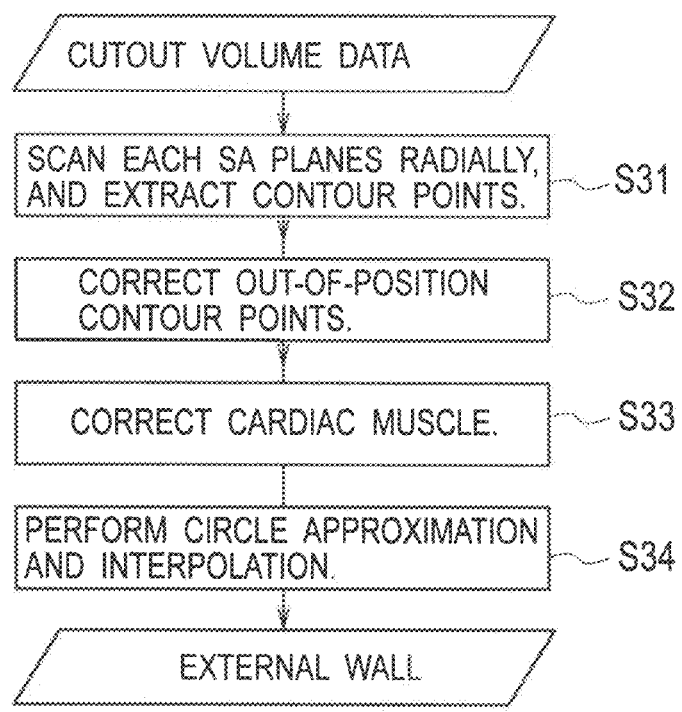
FIG. 24 is a flowchart showing a flow of an external wall extracting processing in the image processing shown in FIG. 3.

Let us return to FIG. 3. In step S4, as shown in FIG. 24, firstly, on the cut-out volume data D2, a scan is radially applied to each of the cross-cut planes (slice planes), and contour points P3 of the external wall are extracted (step S31). Subsequently, out-of-position points are corrected (step S32). Afterward, the cardiac muscle is corrected (step S33). Then, the circle approximation and the interpolation are performed (step S34).

Figure 25:
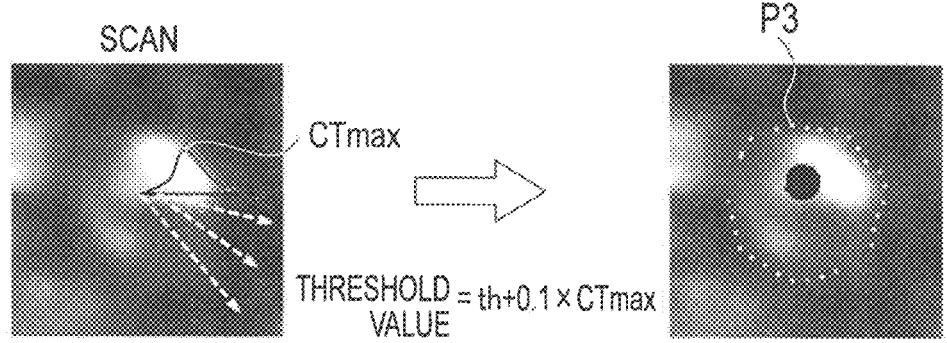
FIG. 25 is an explanatory diagram for explaining how contour points are extracted in the external wall extracting processing shown in FIG. 24.

In step S31 of FIG. 24, as shown in FIG. 25, the scan is radially performed in 32 directions, for instance. Through a threshold process, the contour points P3 of the external wall are extracted. Threshold values used for extracting each of the contour points of the external wall are controlled by use of a maximum CT value of the corresponding scan path. In addition, consideration is given to the influence of CT values in the vicinity. Each threshold value Th is set, for example, to satisfy Th=th+0.1×CTmax.

Figure 26:
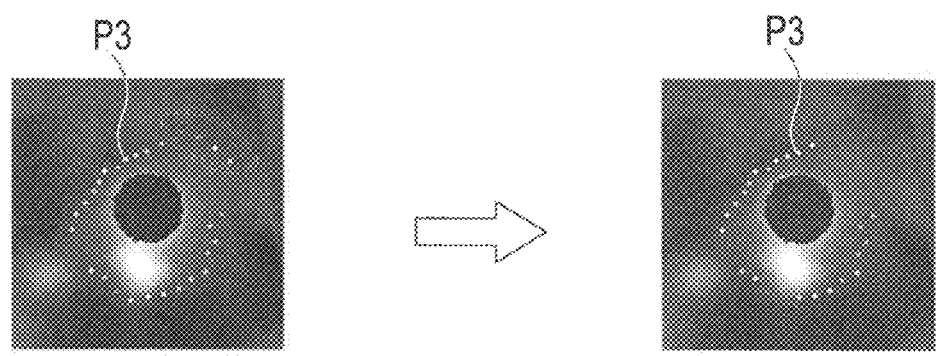
FIG. 26 is an explanatory diagram for explaining how out-of-position points are corrected in the external wall extracting processing shown in FIG. 24.

In step S32 of FIG. 24, as shown in FIG. 26, of the extracted contour points P3 of the external wall, out-of-position points are corrected. For instance, contour points P3 extracted in wrong positions because a vein or the cardiac muscle is located near the external wall are recognized as the out-of-position points, and thus removed. A method employed for this removal may be performed, for instance, by calculating a standard deviation of distances from the core point P1 to the contour points P3, and removing the contour points (only externally-located contour points) P3 falling outside the standard deviation as the out-of-position points.

Figure 27:
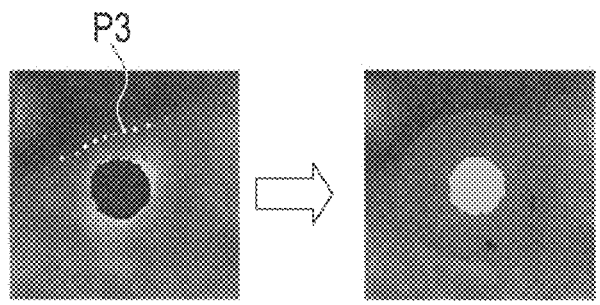
FIG. 27 is an explanatory diagram for explaining how the cardiac muscle is corrected in the external wall extracting processing shown in FIG. 24.
Figure 28:
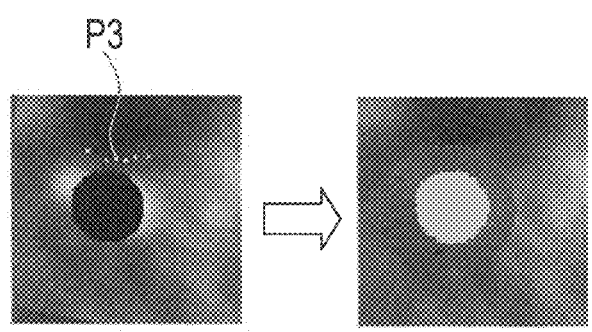
FIG. 28 is another explanatory diagram for explaining how the cardiac muscle is corrected in the external wall extracting processing shown in FIG. 24.

In step S33 of FIG. 24, if the contour of the external wall and the contour of the cardiac muscle cannot be distinguished from each other in a specific slice plane as shown in FIGS. 27 and 28, specifically, a place in which the diameter of the external wall is abruptly different between the specific slice plane and its adjacent slice plane or a place in which no internal wall (no core point P1) exists inside the external wall is determined as being a failure. For a place determined as a failure, the center of the blood vessel is used as a center of the lumen, the diameter of the external wall is found by calculating a mean between the smallest diameter of the space and the diameter of the external wall in the preceding slice plane. Thereby, the external wall is furnished with contour points P3. In other words, the center of the blood vessel and the smallest diameter of the external wall are found, and a mean between the smallest diameter of the external wall and the diameter of the external wall in the preceding slice plane is thus used as a diameter of the external wall. The following points should be noted. In a case where the cardiac muscle whose condition is as shown in the left diagram of FIG. 27 is not corrected, the diameter of the external wall is abruptly larger than the diameter of the external wall in the preceding slice plane. As a result, the continuity is interrupted. In a case where the cardiac muscle whose condition is as shown in the left diameter of FIG. 28 is not corrected, the lumen falls outside the external wall. As a result, the continuity is similarly interrupted.

Figure 29:
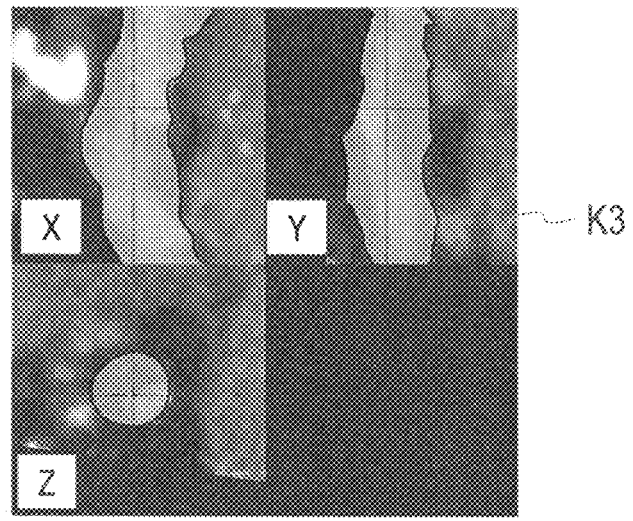
FIG. 29 is an explanatory diagram for explaining an external wall extraction result obtained through the external wall extracting processing shown in FIG. 24.

Finally, in step S34 of FIG. 24, the contour points P3 of the external wall which are acquired from the multiple slice planes is subjected to the circle approximation for each slice plane, for instance. Furthermore, on the three-dimensional volume data D1, an interpolation is sequentially made between each two adjacent approximate circles in the slice direction. Thereby, as shown in FIG. 29, an external wall extraction result K3 is obtained.

Figure 30:
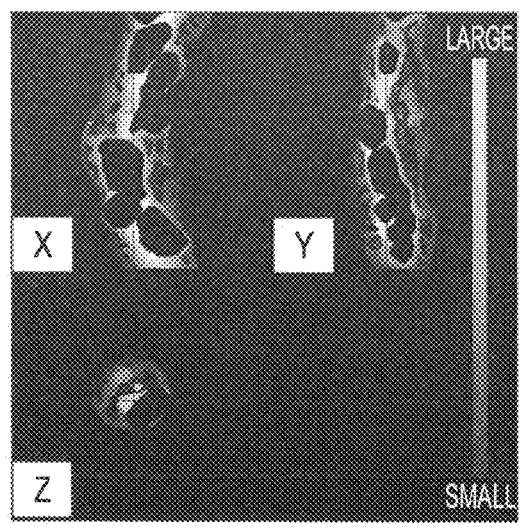
FIG. 30 is an explanatory diagram for explaining a difference image obtained through a plaque extracting processing in the image processing shown in FIG. 3.
Figure 31:
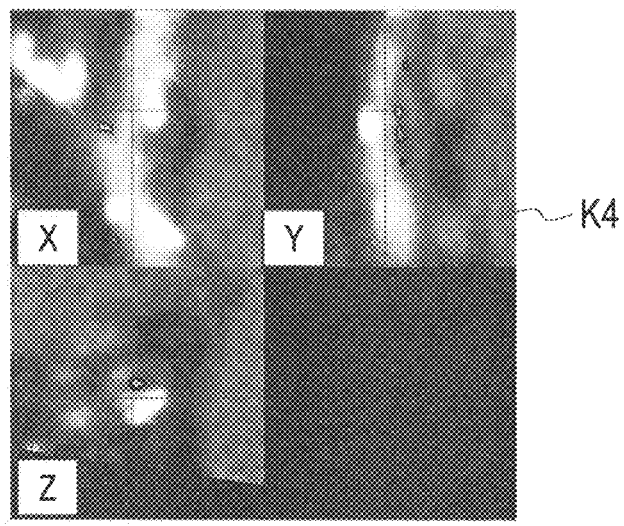
FIG. 31 is an explanatory diagram for explaining a plaque extraction result obtained through the plaque extracting processing in the image processing shown in FIG. 3.

Let us return to FIG. 3. In step S5, an area whose CT value is lower than the CT values of its vicinities is extracted as the plaque. In other words, clustering of a region inside the blood vessel wall is performed, and an area darker than its vicinities is searched for. In detail, in step S5, the region inside the blood vessel wall is smoothed by use of a three-dimensional smoothing filter, and the original region inside the blood vessel wall is subtracted from a smoothed image obtained by the smoothing. Thereby, an image as shown in FIG. 30 is obtained. Thereafter, on the basis of the difference, an area whose value is not lower than a certain value is extracted as the plaque. Consequently, as shown in FIG. 31, a plaque extraction result K4 is obtained.

In the above-described manners, the calcification extraction result K1, the lumen extraction result K2, the external wall extraction result K3 and the plaque extraction result K4 are obtained, and these results are sequentially stored in the storage 15. In addition, an image corresponding to these results is displayed on the display 13. Diagnosticians such as physicians make a diagnosis by visually checking the image.

For this image process, multiple contour points P2 of the lumen are extracted by use of multiple slice images (cross-sectional images) included in the CPR images. Thereafter, the circle approximation and the three-dimensional interpolation (3D interpolation) are applied, and the contour of the lumen is established. At this time, if the contour of the lumen is not continuous, or the contour of the lumen is not smoothed, the correction is performed as a result of consideration given to the continuity of the lumen in the longitudinal direction (the extending direction of the vessel) which is the slice direction. This makes it possible to ensure the continuity in the slice direction for the lumen, and further makes it possible to prevent a false detection of the lumen due to blurring of the calcification.

Figure 32:
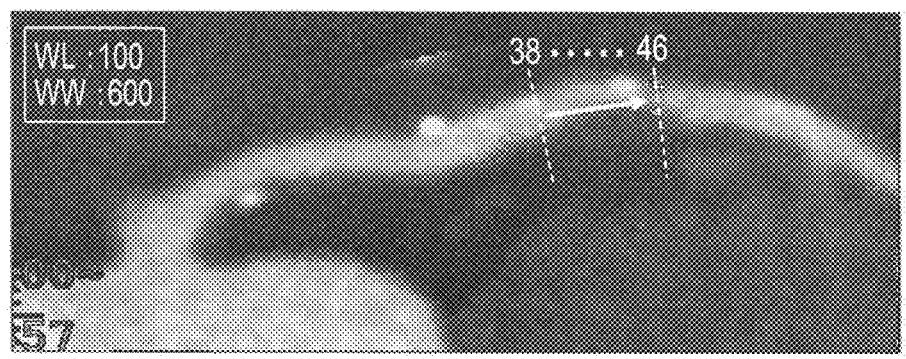
FIG. 32 is a schematic diagram showing the coronary artery of the heart.

In this respect, for instance, when a region of the coronary artery corresponding to reference numerals 38 to 46 in FIG. 32 is cut out as the processing region R1 shown in FIG. 4 and the forgoing processes are applied to the region, the calcification extraction result K1, the lumen extraction result K2, the external wall extraction result K3 and the plaque extraction result K4 are obtained as the extraction results (see FIG. 7, FIG. 23, FIG. 29 and FIG. 31).

Figure 33:
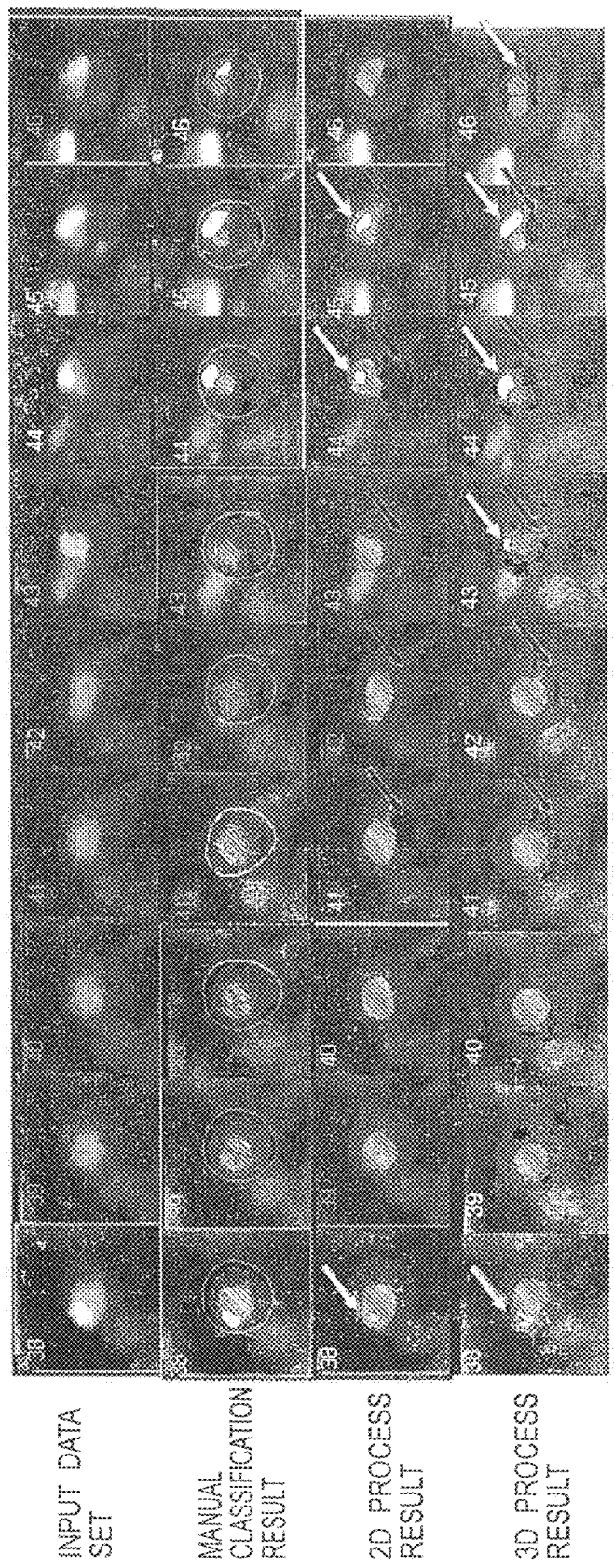
FIG. 33 is an explanatory diagram for explaining an extraction result obtained by extracting and classifying a portion of the coronary artery shown in FIG. 32.

As shown in FIG. 33, slice images 38 to 46 in the Z-axis direction are obtained as three-dimensional processing results (3D processing results), and displayed on the display 13. Note that FIG. 33 includes slice images 38 to 46 obtained from input data sets, manual classification results, and two-dimensional processing results (2D processing results). The input data sets are raw data sets. The manual classification results are results obtained through classification by diagnosticians such as physicians who perform input operation on the operation unit while visually checking the input data sets. The two-dimensional processing results are results obtained from two-dimensional processing using two-dimensional volume data sets.

In the two-dimensional processing results, as indicated by black arrows and white arrows in FIG. 33, the plaque (see black areas in FIG. 33) and the calcification (see white areas in FIG. 33) abruptly appear in, and disappear from, some of a series of adjacent slice images. This phenomenon is conspicuous particularly in the plaque. It is thus learned that no continuity is observed in the plaque area or the calcification area. These discontinuities results from the two-dimensional processing which is performed on each slice image. Furthermore, in some of the two-dimensional processing results, as indicated by the white arrows in FIG. 33, the calcification (see the white areas in FIG. 33) exists inside the lumen (see diagonally-hatched sections in FIG. 33) because a false detection of a lumen due to blurring of the calcification. In other words, in the two-dimensional process, the blurred area of the calcification is detected as the lumen.

Meanwhile, in the three-dimensional processing results, as indicated by black arrows and white arrows in FIG. 33, the plaque and the calcification are continuous among the series of adjacent slice images. In addition, as indicated by the white arrows in FIG. 33, a false detection lumen due to the blurring of the calcification does not occur, and the calcification exists outside the lumen. Accordingly, unlike in the foregoing two-dimensional processing results, classified areas such as the plaque area and the calcification area no longer abruptly appear in, or disappear from, any of the series of adjacent slice images. Consequently, the continuity in the slice direction can be ensured for the classified areas (such as the plaque area and the calcification area). Furthermore, it is possible to prevent a false detection of a lumen due to blurring of the calcification.

Furthermore, it takes a longer time to perform the manual classification process, because the classification task needs to be manually carried out by the diagnosticians such as the physicians. Moreover, it is difficult to classify minute portions of the blood vessel. Particularly because the classification task depends on experience and skill of the diagnosticians, diagnosticians with insufficient experience and skill may require extremely long to perform the task, and make it difficult to classify minute portions of the blood vessel.

On the contrary, in the three-dimensional processing results, images for which the continuity is ensured so that the accurate classification is carried out are automatically displayed. This makes it possible to enhance the task efficiency and to carry out an accurate diagnosis. Particularly, the conditions of the blood vessel of the heart of the patient can be accurately grasped regardless of the experience and skill of the diagnosticians, and thereby an accurate diagnose can be performed.

In the embodiment of the present invention, as described above, the CPR images each including the multiple slice images are created from the three-dimensional volume data D1; the multiple contour points P2 of the lumen are acquired by use of the slice images included the acquired CPR images; some of the acquired contour points P2 are corrected to secure the continuity in the slice direction; the circle approximation and the interpolation are applied to the acquired contour points P2 and the corrected contour points P2; and the contour of the lumen is thus extracted. For this reason, the embodiment of the present invention makes the classified areas such as the plaque area and the calcification area no longer abruptly appear in, or disappear from, any of the series of adjacent slice images. Thereby, the continuity in the slice direction for each classified area can be ensured, and false detection of a lumen due to blurring of the calcification can be prevented. Moreover, the continuity and prevention the false detection can be achieved, thereby enhancing the classification accuracy in which the blood vessel is classified into the areas.

Additionally, performed is the correction in which, of the acquired contour points P2, contour points P2 located in the vicinity of the extracted calcification are relocated inside the blood vessel to smooth the contour of the lumen. By this simple process, the continuity in the slice direction for each classified area can be securely ensured, and accordingly the contour of the lumen can be accurately obtained.

In addition, performed is the correction in which, of the acquired contour points P2, contour points P2 located in the vicinity of the branch of the blood vessel are relocated inside the blood vessel to smooth the contour of the lumen. By this simple process, the continuity in the slice direction for each classified area can be securely ensured, and accordingly the contour of the lumen can be accurately obtained.

Furthermore, by use of the multiple slice images included in the three-dimensional volume data D1, multiple contour points P3 of the external wall are acquired; some of the acquired contour points P3 are corrected to secure the continuity in the slice direction; the circle approximation and the interpolation are applied to the acquired contour points P3 and the corrected contour points P3; and the contour of the external wall is thus extracted. By this, the contour of the external wall can be extracted automatically and accurately, and the contour of the external wall can be extracted while ensuring the continuity.

Moreover, performed is the correction in which, of the acquired contour points P3 of the external wall, contour points P3 away from their corresponding core points P1 of the blood vessel by more than a predetermined distance are removed. By this simple process, the continuity in the slice direction for the external wall area can be securely ensured, and accordingly the contour of the external wall can be obtained accurately.

Furthermore, performed is the correction in which the contour points P3 of the exterior wall is added by use of the adjacent slice images while monitoring the diameter of the blood vessel. By this simple process, the continuity in the slice direction for the external wall area can be securely ensured, and accordingly the contour of the external wall can be obtained accurately.

In this respect, detailed descriptions will be provided with attention being paid to the cross-sectional direction of each slice image. The longitudinal line (for instance, the core line) representing how the blood vessel runs is extracted from the three-dimensional volume data D1 being the medical image. Then, multiple longitudinal cross-sectional images extending along the longitudinal line is generated, the images being cross-sectional images of the blood vessel. Thereafter multiple short-axis cross-sectional images intersecting the longitudinal line are generated, the images being cross-sectional images of the blood vessel. Subsequently, the specific structural elements of the blood vessel are detected from each of the multiple short-axis cross-sectional images. Finally, the specific structural elements detected from each of the multiple short-axis cross-sectional images are corrected on the basis of the multiple longitudinal cross-sectional images. Thereby, the three-dimensional processing is performed using the three-dimensional volume data D1. For this reason, the classified areas such as the plaque area and the calcification area no longer abruptly appear in, or disappear from, any of the series of adjacent slice images. Accordingly, the continuity in the slice direction for each classified area can be ensured, and a false detection of a lumen due to blurring of the calcification can also be prevented. Moreover, the continuity can be ensured and the false detection can be prevented, thereby improving the accuracy of the classification in which the blood vessel is classified into the areas.

Particularly, in the embodiment of the present invention: multiple longitudinal cross-sectional images radially intersecting one another on a line parallel with the longitudinal line are created; the specific structural elements of the blood vessel are detected from each of the longitudinal cross-sectional images; and the correction is performed so that a positional relationship becomes consistent between the specific structural element detected from each of the plurality of longitudinal cross-sectional images and the specific structural element detected from each of the plurality of short-axis cross-sectional images. Thereby, the continuity in the slice direction for each classified area can be ensured, and a false detection of a lumen due to blurring of the calcification can be securely prevented.

In addition, in the embodiment of the present invention: the lumen and the calcification area of the blood vessel are detected; and a correction is performed in which the lumen of the blood vessel is moved inside the blood vessel so that the influence of the reconstruction functions on the calcification area of the blood vessel is reduced. By this simple process, the continuity in the slice direction for each classified area can be securely ensured, and the contour of the lumen can be obtained accurately.

Furthermore, in the embodiment of the present invention: whether a branch extends from the blood vessel is judged depending on a relationship between positions of the lumen of the blood vessel, the positions being respectively detected from the multiple longitudinal cross-sectional images, and on a basis of this judgment, the correction unit performs correction in which the lumen of the blood vessel is moved inside the blood vessel so that the lumen of the blood vessel is smoothed. By this simple process, the continuity in the slice direction for each classified area can be ensured, and the contour of the lumen can be obtained accurately.

Note that the present invention is not limited to the above-described embodiment, and can be variously modified within a scope not departing from the gist of the present invention. For instance, some components may be eliminated from all the components shown for the above-described embodiment. Furthermore, components which lead the above-described embodiment to a different embodiment may be combined with the components shown for the above-described embodiment whenever deemed necessary. Moreover, the various values quoted for the above-described embodiment are examples. The values are not limited to their quoted examples.

Although the medical imaging apparatus 2 is configured by use of the X-ray tomograph (an X-ray CT apparatus) or the like in the foregoing embodiment, the configuration of the medical imaging apparatus 2 is not limited to this case. Instead, for instance, image taking apparatuses of any other type may be used for the medical imaging apparatus 2. Furthermore, the medical image diagnosis system 1 may be configured by building the medical image processor 4 in the medical imaging apparatus 2 such as the X-ray tomograph.

What is claimed is:

1. A medical image processor comprising: an extraction unit configured to extract a longitudinal line from three-dimensional volume data for a medical image, the longitudinal line representing how a blood vessel runs; a longitudinal cross-sectional image generator configured to generate a plurality of longitudinal cross-sectional images which radially intersect one another on a line parallel with the longitudinal line, the longitudinal cross-sectional images being cross-sectional images of the blood vessel; a short-axis cross-sectional image generator configured to generate a plurality of short-axis cross-sectional images intersecting the longitudinal line, the short-axis cross- sectional images being cross-sectional images of the blood vessel; a structure element detector configured to detect a specific structural element of the blood vessel from each of the plurality of short-axis cross-sectional images and the plurality of longitudinal cross-sectional images, the specific structural element being a lumen and a calcification area of the blood vessel; and a correction unit, including a processor, configured to correct the specific structural element detected from each of the plurality of short-axis cross-sectional images on a basis of the plurality of longitudinal cross-sectional images so that a positional relationship becomes consistent between the specific structural element detected from each of the plurality of longitudinal cross-sectional images and the specific structural element detected from each of the plurality of short-axis cross-sectional images, wherein the correction unit extracts a plurality of contour points of the lumen of the blood vessel, and measures a distance between one of the contour points as a target contour point and a straight line joining two contour points located respectively before and after the target contour point, if the distance is larger than a certain distance, the correction unit determines that the target contour point is a front end point of a branch of the vessel, and the correction unit performs correction in which the lumen of the blood vessel is moved inside the blood vessel so that the lumen of the blood vessel is smoothed.

2. The medical image processor according to claim 1, wherein the medical image is an X-ray CT image acquired by: convolving with reconstruction functions X-ray projection images of a subject which are taken in a plurality of directions, and the correction unit performs correction in which the lumen of the blood vessel is moved inside the blood vessel so that influence of the reconstruction functions on the calcification area of the blood vessel is reduced.

3. A medical image processing method comprising:

extracting a longitudinal line from three-dimensional volume data for a medical image, the longitudinal line representing how a blood vessel runs;

generating a plurality of longitudinal cross-sectional images, which radially intersect one another on a line parallel with the longitudinal line, the longitudinal cross-sectional images being cross-sectional images of the blood vessel;

generating a plurality of short-axis cross-sectional images intersecting the longitudinal line, the short-axis cross-sectional images being cross-sectional images of the blood vessel;

detecting a specific structural element of the blood vessel from each of the plurality of short-axis cross-sectional images and the plurality of longitudinal cross-sectional images, the specific structural element being a lumen and a calcification area of the blood vessel;

correcting, by a processor, the specific structural element detected from each of the plurality of short-axis cross-sectional images on a basis of the plurality of longitudinal cross-sectional images so that a positional relationship becomes consistent between the specific structural element detected from each of the plurality of longitudinal cross-sectional images and the specific structural element detected from each of the plurality of short-axis cross-sectional images;

extracting a plurality of contour points of the lumen of the blood vessel;

measuring a distance between one of the contour points as a target contour point and a straight line joining two contour points located respectively before and after the target contour point;

determining that the target contour point is a front end point of a branch of the vessel if the distance is larger than a certain distance; and performing correction in which the lumen of the blood vessel is moved inside the blood vessel so that the lumen of the blood vessel is smoothed.

4. The medical image processing method according to claim 3, wherein the medical image is an X-ray CT image acquired by: convolving with reconstruction functions X-ray projection images of a subject which are taken in a plurality of directions, and in correcting the specific structural element, correction is performed in which the lumen of the blood vessel is moved inside the blood vessel so that influence of the reconstruction functions on the calcification area of the blood vessel is reduced.

* * * * *